Figure 1:
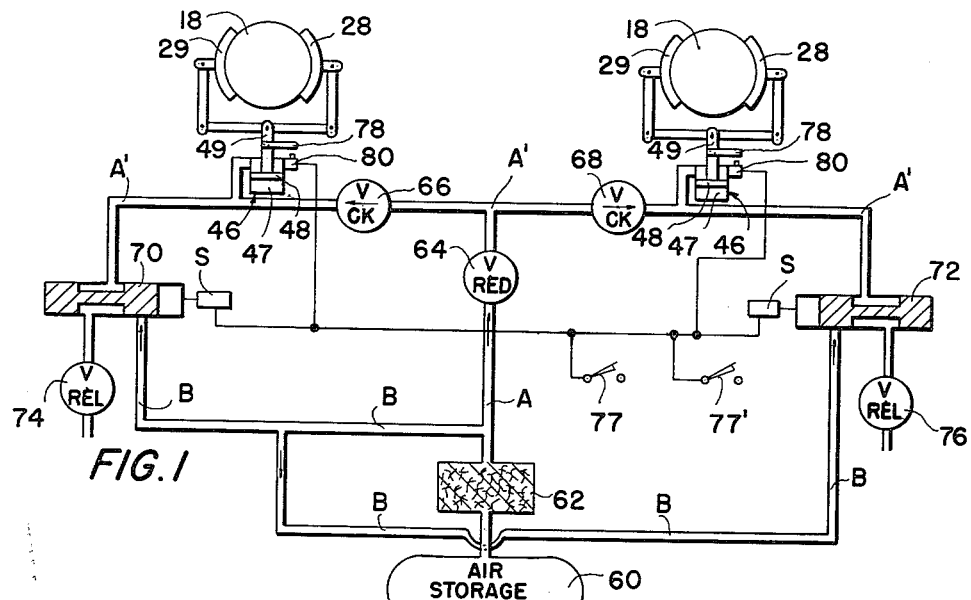

May 21, 1963  B. P. CLARKE  3,090,651
SAFETY DEVICE FOR HOISTING MECHANISMS
Filed April 12, 1961

INVENTOR
BRUCE P. CLARKE
BY
HIS ATTORNEY

May 21, 1963  B. P. CLARKE  3,090,651
SAFETY DEVICE FOR HOISTING MECHANISMS
Filed April 12, 1961  5 Sheets-Sheet 2

INVENTOR
BRUCE P. CLARKE
BY
HIS ATTORNEY

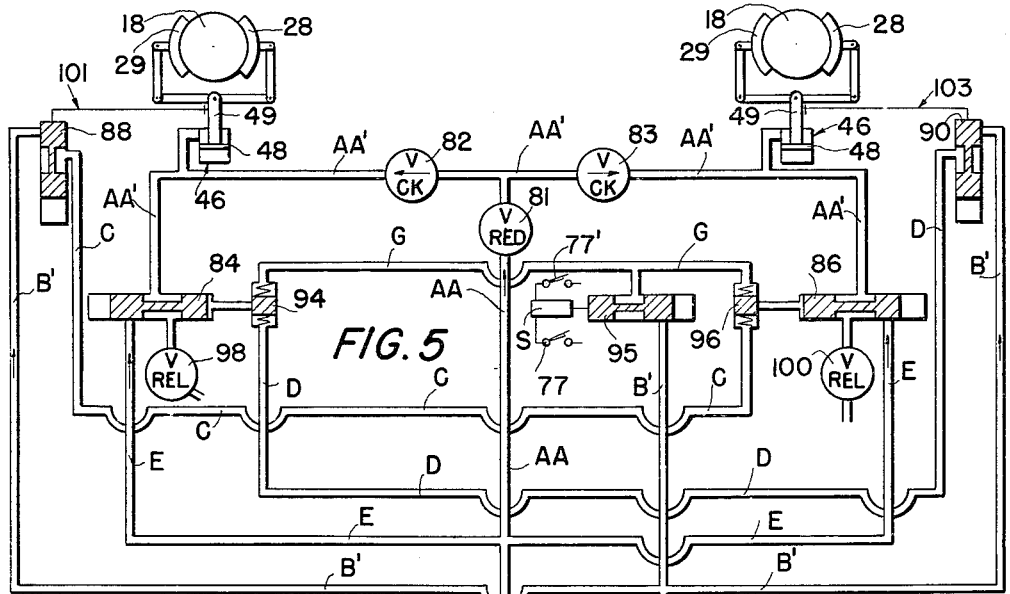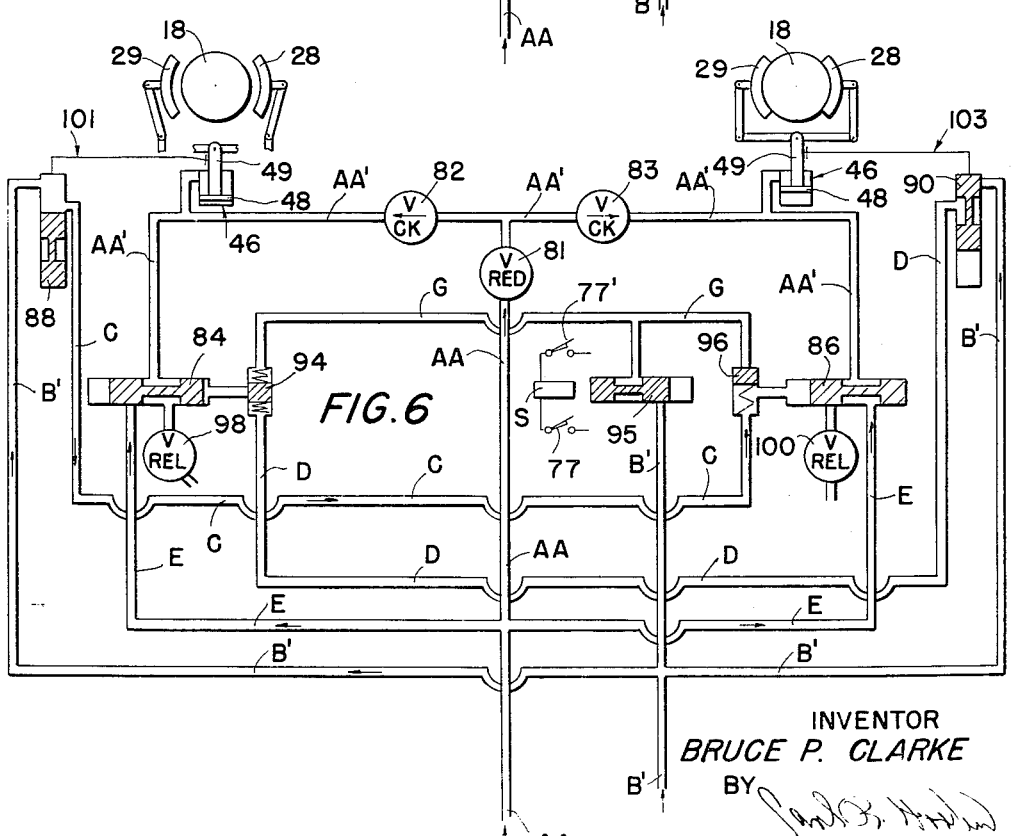

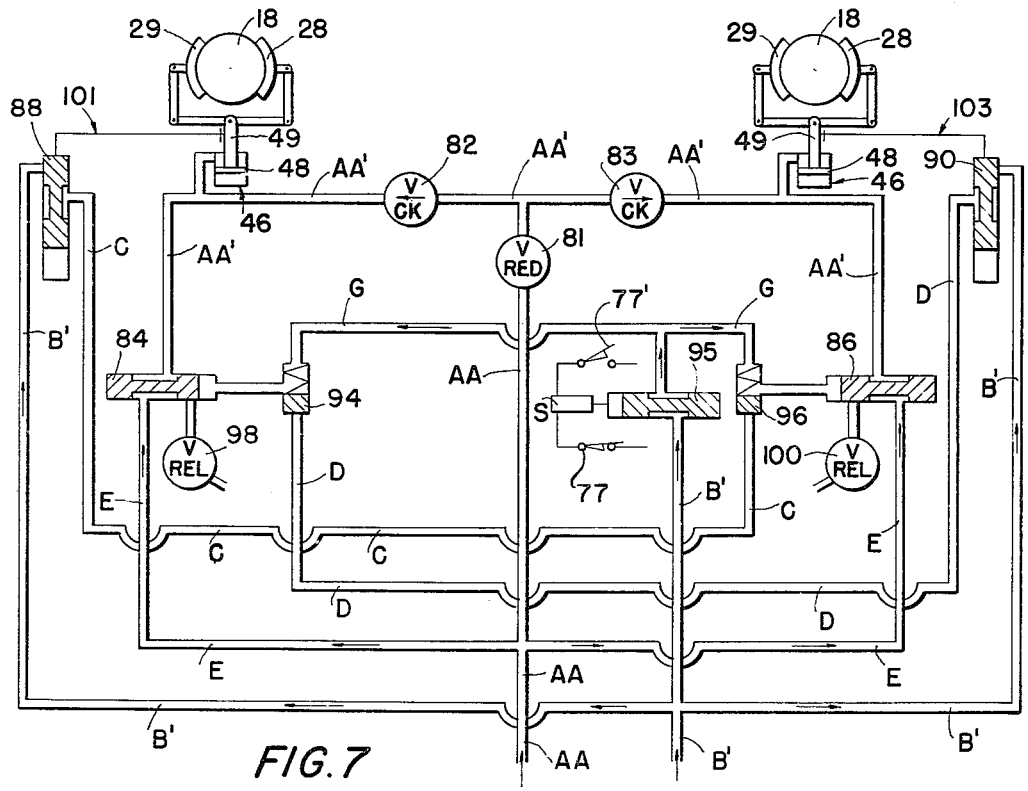

May 21, 1963 B. P. CLARKE 3,090,651
SAFETY DEVICE FOR HOISTING MECHANISMS
Filed April 12, 1961 5 Sheets-Sheet 5

INVENTOR
BRUCE P. CLARKE
BY
HIS ATTORNEY 3,090,651
SAFETY DEVICE FOR HOISTING MECHANISMS
Bruce P. Clarke, Lennoxville, Quebec, Canada, assignor, by mesne assignments, to Ibis Enterprises Limited, Hamilton, Bermuda, a body corporate of Bermuda
Filed Apr. 12, 1961, Ser. No. 102,516
6 Claims. (Cl. 303—6)

This invention relates to hoisting mechanisms and more particularly to a safety device for such hoisting mechanisms.

In presently known mine hoists of the drum type as well as of the friction type, each type is provided with two braking mechanisms, each braking mechanism actuated by a pressure fluid operated brake motor of sufficient capacity to assure effective locking of the cable drums, in particular with respect to safety requirements for hoisting operations in mines. There is also provided for each of these types of hoists a braking arrangement which is operated in case of an emergency such as failure of motive fluid to operate the brake motors which actuate the braking mechanisms. With these arrangements, although highly effective in mine hoist operations, there are still means of more fully protecting such hoists from failure and the consequences thereof, and according to this invention an additional safety device for mine hoists is provided to increase the safety of personnel and material associated with mine hoist operations.

In the commonly known drum and friction type mine hoists, each of the associated braking mechanisms is connected to be actuated by a motor, and pressure fluid from a suitable source of supply is used to operate the motor of the associated braking mechanism. The pressure of the pressure fluid is such to effectively retard and hold the cable drums in a locked position according to an established retardation rate under specified loading conditions. Depending upon the loading conditions such pressure may not be adequate to retard and hold the cable drums in a locked position in case one of the two braking mechanisms fails and, consequently, only one braking mechanism is in operation. In order to eliminate the danger which could result from such a condition, this invention provides means to introduce motive fluid at a pressure higher than the normal operating pressure of the motive fluid to normally operate such motors to both motors or at least to the motor associated with the braking mechanism that is still in operative condition.

One object of this invention is to provide a safety device for mine hoists to detect failure of the braking mechanisms of such hoists.

Another object of this invention is to provide a safety device to increase the braking capacity of at least one of the braking mechanisms of a pair of braking mechanisms when the other braking mechanism fails.

Still another object of this invention is to provide a safety device for mine hoists which is to be operated from various locations.

Other objects of this invention will be in part obvious and in part pointed out hereinafter.

Figure 2:
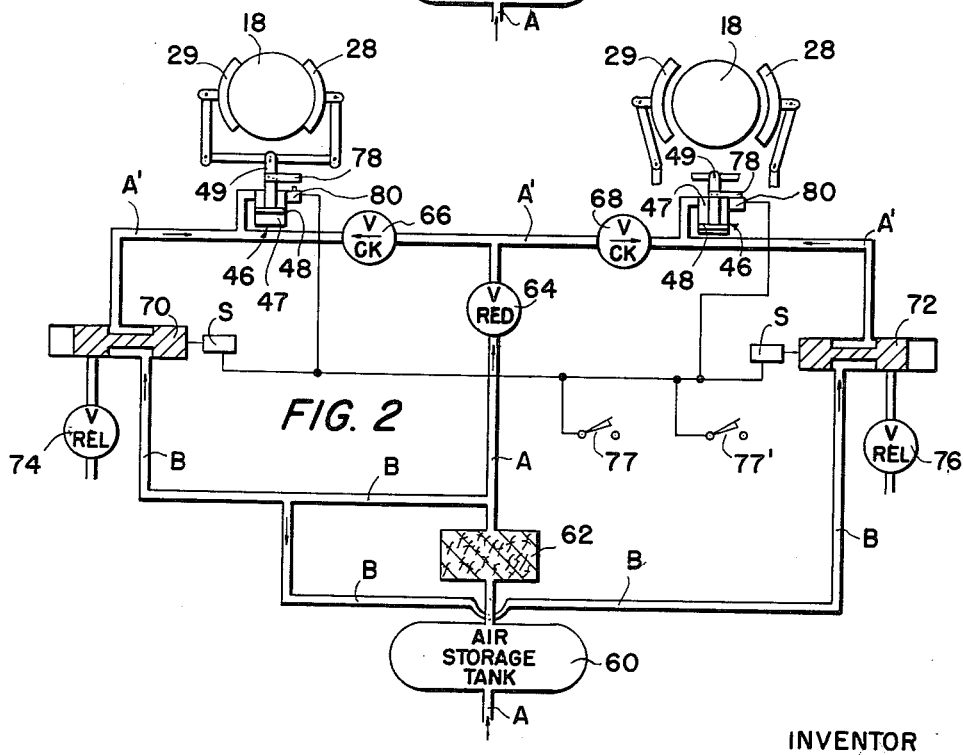
Figure 3:
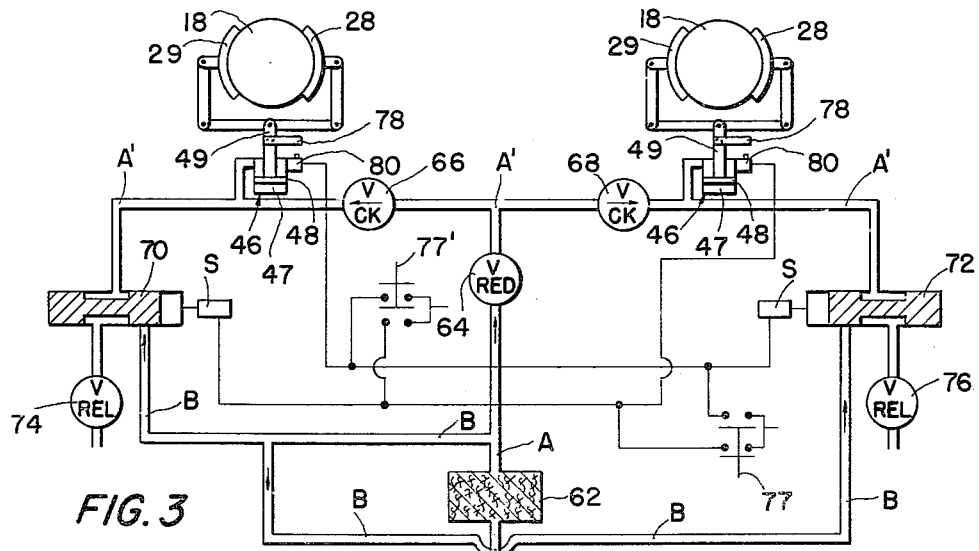
Figure 4:
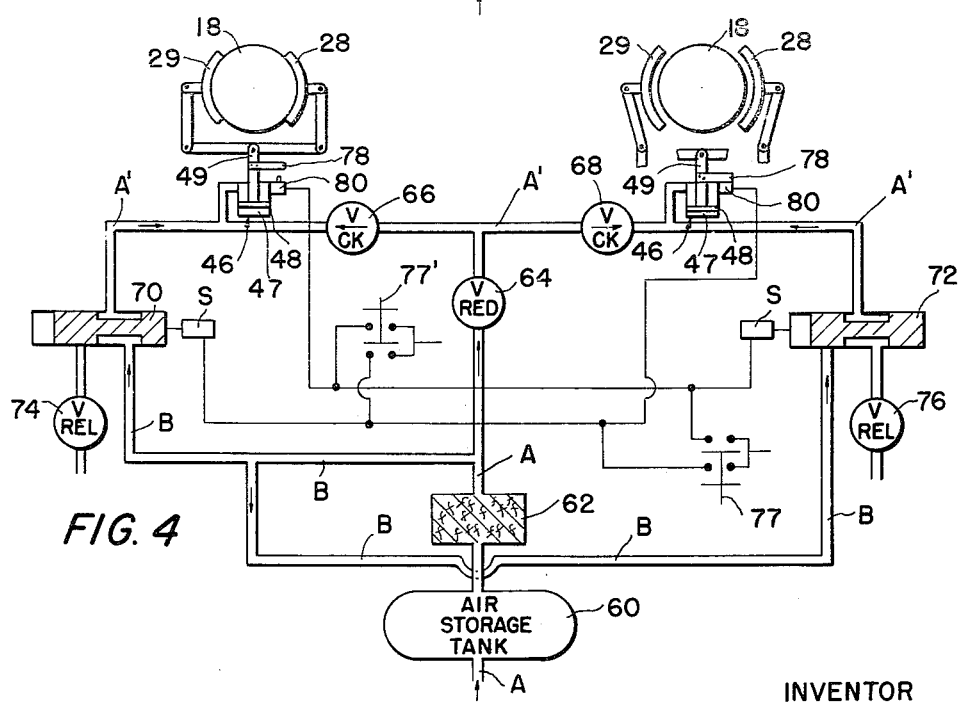
Figure 8:
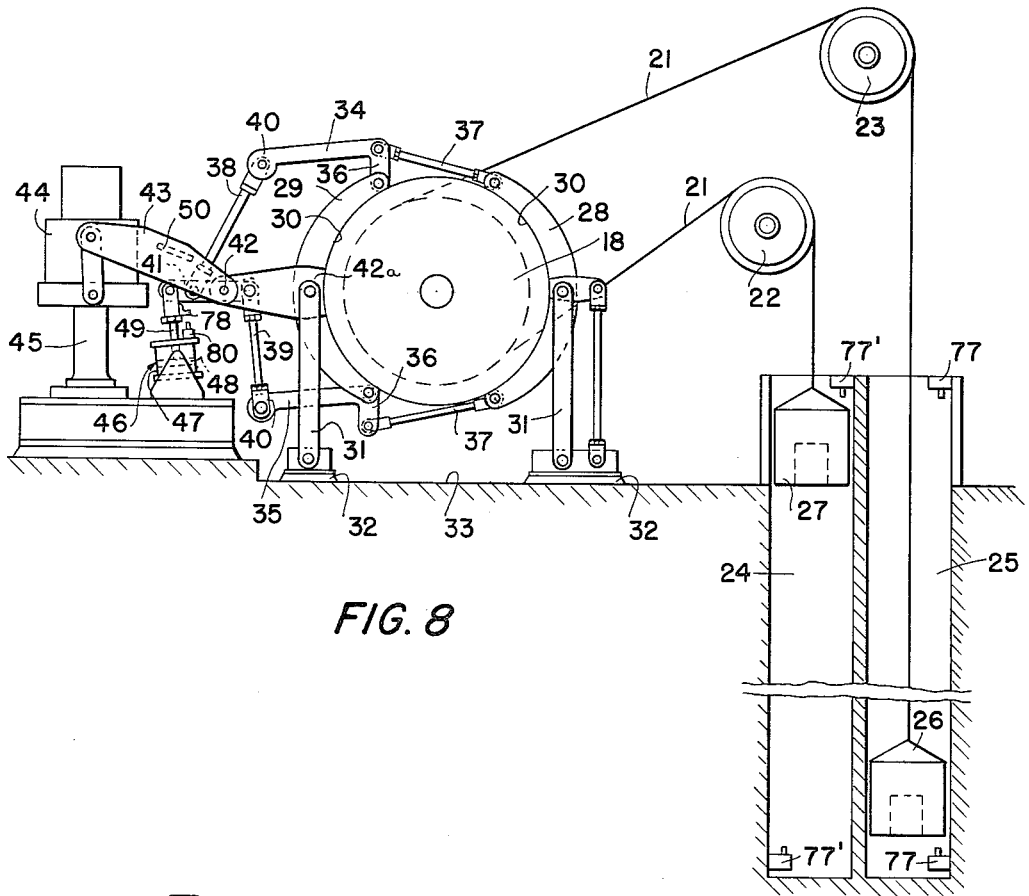
Figure 9:
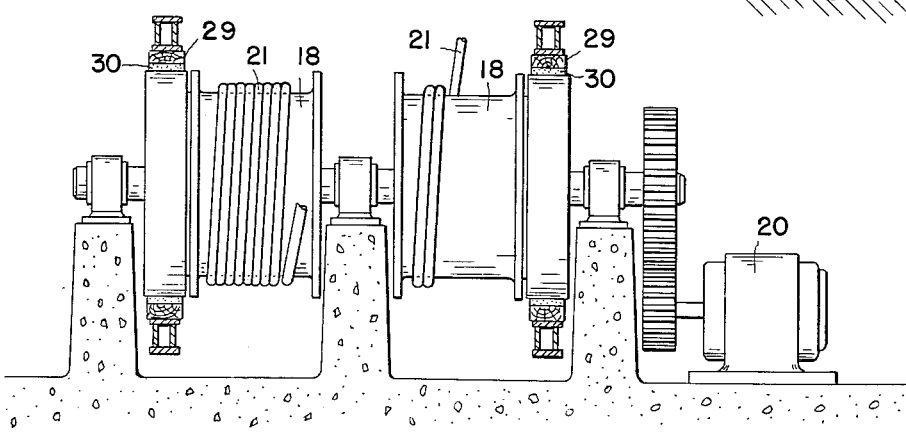

FIGURES 1 and 2 show schematically one embodiment of the safety device according to this invention as applied to a hoisting mechanism operating under normal conditions, and as applied to a hoisting mechanism in which a failure occurs, respectively, FIGS. 3 and 4 show schematically another embodiment of the safety device according to this invention as applied to a hoisting mechanism operating under normal conditions, and as applied to a hoisting mechanism in which a failure occurs, respectively, FIGS. 5 and 6 show schematically yet another embodiment of the safety device according to this invention as applied to a hoisting mechanism operating under normal conditions, and as applied to a hoisting mechanism in which a failure occurs, respectively, FIG. 7 shows schematically the operation of the solenoid valve, shown in FIGS. 5 and 6, in case of an emergency, FIG. 8 shows a diagrammatic view in elevation of a hoisting mechanism equipped with the safety device according to this invention, and FIG. 9 shows partly in section and partly a front view of the hoisting mechanism shown in FIG. 8.

Referring to the drawings, and more particularly to FIGS. 8 and 9, 18 designates the hoist or cable drums of a mine hoist which may be actuated by any suitable prime mover as for example an electric motor 20. Cables 21 are wound around the drums 18 and trained over sheaves 22 and 23 positioned above the entrance of shafts 24 and 25 which contain cages 26 and 27, respectively, that are supported by the cables 21. Each drum 18 is provided with a braking mechanism comprising a pair of brake shoes 28 and 29 having braking surfaces 30 for frictional engagement with the braking surface of the drum. The brake shoes are positioned on opposite sides of the drum and rock upon links 31 which are supported by bearings 32 seated upon the foundation 33 for the hoisting mechanism.

Braking movement is transmitted from one shoe to the other by link means comprising bell cranks 34 and 35 which are pivotally connected to the upper and lower ends of brake shoe 29 and have arms 36 pivotally connected to turn-buckles 37 attached to brake shoe 28. Brake controlling movement is transmitted to the bell cranks 34, 35 by links 38 and 39 connected pivotally to the free ends 40 of the bell cranks 34, 35 and to a rocker arm 41 mounted upon a pivot 42 supported by plates 42a. The links 38 and 39 are connected to the rocker arm 41 on opposite sides of the pivot 42.

An emergency brake in the form of a weight 44 is connected by means of link 43 to pivot 42. Weight 44 is constantly held in an elevated position by pressure fluid conducted to exert force on a piston (not shown) disposed within a cylinder 45 and connected to weight 44 in a commonly known manner. In case of an emergency such as failure of pressure fluid, weight 44, because of failure of pressure fluid to exert force on the piston (not shown) to hold weight 44 in an elevated position, will move downwardly by gravity thereby actuating rocker arm 41, by means of member 50, and the associated link means of the braking mechanism to apply brake shoes 28 and 29 to each drum 18 to lock drums 18 against motion.

Brake movement of the shoes 28, 29 is effected by a motor 46 comprising a cylinder 47 containing a piston 48 provided with a rod 49 that extends through the upper end of cylinder 47 and adapted to be connected to the free end of rocker arm 41 for transmitting movement from the piston to the braking mechanism. When pressure fluid is connected to the upper portion of cylinder 47, piston 48 is forced downwardly to actuate the link means of the braking mechanism and brake shoes 28 and 29 to lock the cable drums 18 against rotation.

A control system (not shown) provided to control the operation of brake motors 46, 46 includes the safety device according to this invention, one embodiment thereof being shown schematically in FIGS. 1 and 2, another embodiment being shown schematically in FIGS. 3 and 4, and yet another embodiment being shown schematically in FIGS. 5 and 6.

Referring to FIG. 1, under normal operational conditions, pressure fluid is supplied from a source of supply (not shown) through pipe line A to an air storage tank 60 from where it is conducted through a filter 62 to a pressure reducing valve 64 in which the plant pressure is reduced to the normal operating pressure for the brake motors 46, 46. From the pressure reducing valve 64 the pressure fluid is conducted through pipe line A' and check valves 66 and 68 to the brake motors 46, 46 of the left hand and of the right hand braking mechanisms.

Pipe line A' also conducts pressure fluid to solenoid operated valves 70 and 72 of a commonly known type positioned such that there is free communication between pipe line A' and pressure relief valves 74 and 76. Whenever the pressure in pipe line A' rises above a predetermined pressure, the excessive pressure relative to the normal operating pressure for the brake motors 46, 46, in the said pipe line A' is relieved by pressure relief valves 74 and 76.

Under normal operational conditions brake motors 46, 46 are operated such that pistons 48, 48 are forced downwardly by pressure fluid to actuate the braking mechanisms to apply each pair of brake shoes 28, 29 to their associated braking surfaces to retard and hold hoist drums 13, 18 in a locked position.

A pipe line B is provided to supply pressure fluid at a pressure higher than the pressure fluid for normally operating brake motors 46, 46 to such brake motors in case one of the braking mechanisms fails. Pipe line B is connected at its one end to pipe line A and conducts pressure fluid at the aforementioned higher pressure to solenoid operated valves 70 and 72. When the brake motors 46, 46 and the braking mechanisms are operating under normal conditions, the solenoid operated valves 70 and 72 (see FIG. 1) are in a position to prevent communication between pipe lines A' and B.

If an emergency arises, caused by, for instance, breakage or maladjustment of a link of the right hand braking mechanism as shown in FIG. 2, such breakage causes the piston and its associated piston rod of the brake motor 46 of the right hand braking mechanism to over-travel the normal operational position relative to normally actuating the braking mechanism. In its downward movement a finger member 78 connected to the piston rod 49 contacts an electrical switch 80 connected with the solenoids S of valves 70 and 72 to energize the solenoids of valves 70 and 72. This causes, by magnetic action, valves 70 and 72 to change their position relative to their normal operating position shown in FIG. 1 of communicating pipe line A' with the relief valves 74 and 76. Valves 70 and 72 are thus actuated into a position as shown in FIG. 2 preventing communication between pipe line A' and relief valves 74 and 76, and permitting communication between pipe lines A' and B. The pressure of the pressure fluid in pipe line B being of higher pressure than the pressure of the pressure fluid in pipe line A' is thus admitted into pipe line A' and into both brake motors 46, 46.

It is to be noted that check valves 66 and 68 prevent flow of pressure fluid upstream of the check valves. Thus pressure fluid at a pressure higher than the pressure of the pressure fluid for normally operating brake motors 46, 46 is conducted to the brake motors 46, 46 to provide additional force to be exerted on the associated pistons of both brake motors. Although only one of the braking mechanisms, the left hand braking mechanism, is in operative condition, the additional force exerted on the associated piston will cause rapid and more effective locking of cable drum 18 against rotary motion than when the lower pressure operational pressure fluid would be applied, as presently practiced in the commonly known mine hoists. It is also to be noted that when valves 70 and 72 are moved into the emergency position (see FIG. 2) there is no communication between pipe lines A', B and the relief valves 74 and 76, thus providing such relief valves inoperative to permit the higher pressure pressure fluid to fully actuate the piston of the left hand braking mechanism brake motor.

Referring now to FIGS. 3 and 4, this embodiment of the invention differs from that shown in FIGS. 1 and 2 in that, when breakage or maladjustment of a link of one of the braking mechanisms takes place, such as that of the right hand braking mechanism, the motor associated with the other braking mechanism is supplied with pressure fluid at a pressure higher than the pressure of the pressure fluid for normally operating the brake motors. Accordingly, the right hand braking mechanism switch 80 is connected to actuate solenoid S of valve 70, while the left hand braking mechanism switch 80 is connected to actuate solenoid S of valve 72.

When, in case of an emergency (see FIG. 4), piston 48 of brake motor 46 of the right hand braking mechanism is caused to overtravel its normal operational position, the associated switch 80 is actuated by finger member 78 to energize solenoid S of valve 70. This causes valve 70 to be positioned to communicate pipe line B with the portion of pipe line A' associated with brake motor 46 for the left hand braking mechanism. Thus, additional force is applied to the brakes associated with the braking mechanism that is still operative, valve 72 maintaining its normal operational position such that no higher pressure pressure fluid is admitted to the brake motor associated with the inoperative braking mechanism.

Provisions are also made to prevent cages 26 and 27 to overtravel their upper and lower limits of normal travel, such overtravel endangering personnel and material. These provisions comprise track limit switches 77 and 77' (see FIGS. 1, 2, 3, 4, 5, 6, 7 and 8) positioned in shafts 24 and 25 at a short distance beyond the normal upper and lower travel limits of cages 26 and 27, the upper and lower limits of travel of the cages being chosen such that enough travel beyond such limits is left for the cages to be halted before crashing into the upper and lower ends of the mine shafts.

Referring to FIGS. 1, 2, 3, 4 and 8, whenever either one or both cages overtravel the associated normal travel limits, either one or both associated limit switches are actuated, and, as each track limit switch 77, 77' is connected to both solenoids S, both solenoids S are energized. This causes, by magnetic action, valves 70 and 72 to change their position as hereinbefore disclosed in connection with failure of one of the braking mechanisms as shown in FIGS. 2 and 4. The left hand as well as the right hand braking mechanisms, both being in normal operative condition, are thus actuated by their associated brake motors to apply the brakes with additional force, relative to the force applied under normal operational conditions to rapidly lock the cable drums against rotary motion and, consequently, to prevent cages 26 and 27 from further travel.

Another embodiment of the safety device according to this invention is schematically shown in FIGS. 5 and 6 as applied to a hoisting mechanism as shown in FIGS. 8 and 9. This safety device is operated by pressure fluid rather than by solenoids as disclosed in connection with FIGS. 1 and 2. Under normal operational conditions, as shown in FIG. 5, plant air pressure is conducted through a pipe line AA to a pressure reducing valve 81 from where it flows through pipe line AA' and check valves 82, 83 to the brake motors 46, 46 of the left hand and the right hand braking mechanisms. Pipe line AA' also conducts pressure fluid to pressure fluid operated valves 84, 86 which are in a position to permit communication of pipe line AA' with relief valves 98 and 100, such that, when the pressure in pipe line AA' rises above a predetermined pressure the excessive pressure in such pipe line AA' is released by relief valves 98 and 100.

Valves 84, 86 are provided to control the flow of pressure fluid at a pressure higher than the pressure of the pressure fluid to normally operate brake motors 46, 46, to brake motors 46, 46. Accordingly, a pipe line E is connected at one end to pipe line AA, the other end of pipe line E being connected to valves 84, 86. Under normal operational conditions, valves 84, 86 are positioned as shown in FIG. 5, there being no communication between pipe lines E, E and AA', AA'. Communication between pipe lines E, E, and AA', AA' is effected only in cases of emergency as will be explained hereinafter.

Valves 84, 86 are actuated by pressure fluid, the admittance of such pressure fluid to actuate valves 84, 86 being controlled by pressure fluid operated shuttle valves 94, 96, respectively, of a commonly known type.

Each brake motor 46 of the braking mechanisms is provided with, respectively, cam means or a lever system 101 to transmit motion from piston rod 49 of the left hand brake motor 46 to a mechanically operated valve 88, and cam means or a lever system 103 to transmit motion from piston rod 49 of the right hand brake motor 46 to a mechanically operated valve 90. Valves 88, 90 are shown in FIG. 5 in their normal operating position, the left hand as well as the right hand braking mechanisms operating under normal conditions.

A pipe line B' is connected to a source of supply (not shown) to conduct pressure fluid to mechanically operated valves 88 and 90, such pressure fluid serving only to actuate control valves 84, 86, and shuttle valves 94, 96. It is to be noted that shuttle valve 94 for controlling the actuation of valve 84 is connected to cam or lever actuated valve 90 by means of a pipe line D, shuttle valve 96 for controlling the actuation of valve 86 being connected to cam or lever actuated valve 88 by means of a pipe line C.

In case of an emergency caused by, for instance, breakage or maladjustment of a link of the left hand braking mechanism, as shown in FIG. 6, the cam or lever means 101 connected to piston rod 49 of the associated brake motor 46 actuates valve 88 downwardly to permit communication between pipe line B' and pipe line C. When valve 88 is in a position as shown in FIG. 6, pressure fluid is thus conducted from pipe line B' through pipe line C to actuate shuttle valve 96 into a position such that pressure fluid from pipe line C actuates valve 86 to permit communication of pipe line E with that portion of pipe line AA' associated with the right hand braking mechanism. In this manner pressure fluid at full plant pressure is thus conducted to brake motor 46 of the right hand braking mechanism in order to exert additional force to the force exerted by the pressure fluid for normally operating brake motor 46, on piston 48 of the brake motor 46 of the right hand braking mechanism. Such additional force exerted on the piston thus assures additional locking of the cable drums 18 against rotary motion as explained hereinbefore in connection with the embodiment of the safety device shown in FIGS. 1 and 2.

It is to be noted that when valve 86 is actuated to the right into a position to communicate pipe line E and pipe line AA', valve 86 blocks the admittance of pressure fluid to pressure relief valve 100 to render such valve 100 inoperative when the pressure in pipe line AA' is boosted to effect emergency braking as hereinbefore described.

When valve 86 is actuated into such position to permit communication of pipe line E with pipe line AA' associated with the right hand braking mechanism, there is provided for the conductance of pressure fluid at a pressure higher than the pressure of the pressure fluid for normally operating motors 46, 46, to motor 46 of the right hand braking mechanism to assure rapid action of such motor in case of an emergency. With this safety device, when the left hand braking mechanism fails, the additional pressure boost is directed to the brake motor of the right hand braking mechanism.

In case the right hand braking mechanism fails the additional pressure boost will be conducted to the brake motor of the left hand braking mechanism, valve 90 being actuated by overtravel of the right hand brake motor piston 46 to be positioned to permit pressure fluid to be conducted from pipe line B' through pipe line D to actuate shuttle valve 94. This causes control valve 84 to be actuated such that communication is effected between pipe line E and that portion of pipe line AA' associated with the left hand braking mechanism and brake motor. Additional pressure boost is thus directed to assure rapid action of the left hand braking mechanism whenever the right hand braking mechanism fails.

Track limit switches 77 and 77' positioned in locations of the mine shafts as described in connection with FIGS. 1 and 2 are incorporated in the embodiment of the safety device as shown in FIGS. 5, 6 and 7. Track limit switches 77 and 77' are connected to a solenoid operated valve 95. Valve 95 is provided to control the flow of pressure fluid at a pressure higher than the pressure of the pressure fluid for normally operating brake motors 46, 46, to both brake motors simultaneously. Accordingly, valve 95 is connected to pipe line B' and pipe line G, pipe line G connecting valve 95 with both shuttle valves 94, 96.

In case of an emergency when one of the cages overtravels its normal limit of travel and actuates either one of the limit switches, solenoid S is energized. This causes valve 95 to be moved to the right (see FIG. 7) into a position to permit pipe line B' to communicate with pipe line G, in order to conduct pressure fluid to both shuttle valves 94 and 96. Both shuttle valves 94 and 96 will then be forced downwardly such that pressure fluid from pipe line G is conducted to actuate valve 84 to the left, and valve 86 to the right to provide communication between pipe lines E and AA' to effect simultaneously a boost in the pressure of the pressure fluid for both brake motors 46, 46. In this manner, in case thus either one of the track limit switches is actuated by overtravel of either one or both cages, full plant pressure is conducted to the motor 46 of the left hand as well as to the motor 46 of the right hand braking mechanism to assure rapid and proper locking of the associated brakes.

While I have shown and described specific forms of this invention it is to be understood that various changes and modifications may be made without departing from the spirit of the invention as set forth in the appended claims.

I claim:
1. A safety device for a hoisting mechanism for lowering and raising at least one load carrying member within predetermined limits of travel comprising, at least two rotary braking drums connected to each other to be rotated simultaneously, each drum having braking means adapted to be applied to prevent rotation of said drums, a pressure fluid operated motor for each of said braking means to actuate said braking means, connecting means between each of said braking means and the associated motor to transmit motion from said motor to said braking means, a first conduit connected to conduct pressure fluid from a supply of pressure fluid to each of said motors to normally operate said motors, at least one check valve in said first conduit positioned upstream of said motors to prevent reverse flow of pressure fluid from said motors past said check valve, at least one relief valve in said first conduit positioned downstream of said check valve to release excessive pressure in the portion of said first conduit downstream of said check valve, a second conduit connected to conduct pressure fluid from a supply of pressure fluid at a pressure higher than the pressure of the pressure fluid in the last said portion of said first conduit into the last said portion of said first conduit, at least one control valve connected to said first conduit at a point downstream of said check valve and connected to said second conduit and to said relief valve to control the communication between said second conduit and said first conduit and said relief valve, said control valve adapted to prevent communication between said conduits and to permit communication between the last said portion of said first conduit and said relief valve when each of said braking means operates normally, and means operatively associated with said braking means and said load carrying member to actuate said valve to permit communication between said conduits and to prevent communication between said conduits and said relief valve whenever one of said braking means fails and whenever said load carrying member exceeds a predetermined limit of travel.

2. The device claimed in claim 1 in which the last said means includes a solenoid connected to operate said control valve, and switch means connected to operate said solenoid whenever one of said braking means fails and whenever said load carrying member exceeds a predetermined limit of travel.

3. A safety device for a hoisting mechanism for lowering and raising at least one load carrying member within predetermined limits of travel comprising, at least two rotary braking drums connected to each other to be rotated simultaneously, each drum having braking means adapted to be applied to prevent rotation of said drums, a pressure fluid operated motor for each of said braking means connected to actuate said braking means, connecting means between each of said braking means and the associated motor to transmit motion from said motor to said braking means, a first conduit connected to conduct pressure fluid from a supply of pressure fluid to each of said motors to normally operate said motors, at least one check valve in said first conduit positioned upstream of said motors to prevent reverse flow of pressure fluid from said motors past said check valve, at least one relief valve in said first conduit positioned downstream of said check valve to release excessive pressure in the portion of said first conduit downstream of said check valve, a second conduit connected to conduct pressure fluid from a supply of pressure fluid at a pressure higher than the pressure of the pressure fluid in the last said portion of said first conduit into the last said portion of said first conduit, at least one control valve connected to said first conduit at a point downstream of said check valve and connected to said second conduit and to said relief valve to control the communication between said second conduit and said first conduit and said relief valve, said control valve adapted to prevent communication between said conduits and to permit communication between the last said portion of said first conduit and said relief valve when each of said braking means operates normally, a solenoid operatively connected to said first said control valve, and switch means operatively connected to be actuated by said braking means and by said load carrying member to energize said solenoid.

4. A safety device for a hoisting mechanism for lowering and raising at least one load carrying member within predetermined limits of travel comprising, at least two rotary braking drums connected to each other to be rotated simultaneously, each drum having braking means adapted to be applied to prevent rotation of said drums, a pressure fluid operated motor for each of said braking means connected to actuate said braking means, connecting means between each of said braking means and the associated motor to transmit motion from said motor to said braking means, each motor having a first conduit connected thereto to conduct pressure fluid from a supply of pressure fluid to normally operate each motor, a check valve in each of said first conduits positioned upstream of the associated motor, a second conduit to conduct pressure fluid from a supply of pressure fluid at a pressure higher than the pressure of the pressure fluid to normally operate said motors connected to each of said first conduits at a point downstream of the associated check valve, a first pressure fluid operated control valve for each first conduit connected at a point downstream of the associated check valve and connected to said second conduit to control the flow of such higher pressure pressure fluid from said second conduit into the associated first conduit, each of said first control valves being connected to be operated by a second pressure fluid operated control valve, a third conduit connected to a supply of pressure fluid to conduct pressure fluid to said second control valves, a third control valve for each motor connected to be actuated by the associated motor positioned to control the flow of pressure fluid from said third conduit to operate the associated second control valve such that the third control valve connected to be actuated by one of said motors controls the flow of pressure fluid through said third conduit to the second control valve which controls the first control valve associated with the other motor, the position of said third control valves being such that when said motors operate normally flow of pressure fluid through said third conduit is prevented from flowing to actuate said second control valves and said first control valves, each of said first control valves being adapted and positioned such that when said motors operate normally flow of the higher pressure pressure fluid from said second conduit is prevented from flowing into said first conduits, the position of the third control valve connected to be actuated by one of said motors being such that when the last said one of said motors fails said last said third control valve is actuated to permit pressure fluid to flow through said third conduit to actuate the second control valve which controls the first control valve associated with the other of said motors to permit the higher pressure pressure fluid from said second conduit to flow into the first conduit associated with the last said other of said motors.

5. A safety device for a hoisting mechanism for lowering and raising at least one load carrying member within predetermined limits of travel comprising, at least two rotary braking drums connected to each other to be rotated simultaneously, each drum having braking means adapted to be applied to prevent rotation of said drums, a pressure fluid operated motor for each of said braking means connected to actuate said braking means, connecting means between each of said braking means and the associated motor to transmit motion from said motor to said braking means, each motor having a first conduit connected thereto to conduct pressure fluid from a supply of pressure fluid to normally operate each motor, a check valve in each of said first conduits positioned upstream of the associated motor, a second conduit to conduct pressure fluid from a supply of pressure fluid at a pressure higher than the pressure of the pressure fluid to normally operate said motors connected to each of said first conduits at a point downstream of the associated check valve, a first pressure fluid operated control valve for each first conduit connected at a point downstream of the associated check valve and connected to said second conduit to control the flow of such higher pressure pressure fluid from said second conduit into the associated first conduit, a relief valve for each of said first conduits positioned downstream of the associated check valve to release excessive pressure in the portion of each of said first conduits downstream of the associated check valve, each of said first control valves being connected to be operated by a second pressure fluid operated control valve, a third conduit connected to a supply of pressure fluid to conduct pressure fluid to said second control valves, a third control valve for each motor connected to be actuated by the associated motor positioned to control the flow of pressure fluid from said third conduit to operate the associated second control valve such that the third control valve connected to be actuated by one of said motors controls the flow of pressure fluid through said third conduit to the second control valve which controls the first control valve associated with the other motor, the position of said third control valves being such that when said motors operate normally flow of pressure fluid through said third conduit is prevented from flowing to actuate said second control valves and said first control valves, each of said first control valves being adapted and positioned such that when said motors operate normally flow of the higher pressure pressure fluid from said second conduit is prevented from flowing into said first conduits and to permit communication between each of the relief valves with the associated portion of each first conduit downstream of the associated check valve, the position of the third control valve connected to be actuated by one of said motors being such that when the last said one of said motors fails said last said third control valve is actuated to permit pressure fluid to flow through said third conduit to actuate the second control valve which controls the first control valve associated with the other of said motors to permit the higher pressure pressure fluid from said second conduit to flow into the first conduit associated with the last said other of said motors and to prevent communication of the first conduit associated with the last said other of said motors with the associated relief valve.

6. A safety device for a hoisting mechanism for lowering and raising at least one load carrying member within predetermined limits of travel comprising, at least two rotary braking drums connected to each other to be rotated simultaneously, each drum having braking means adapted to be applied to prevent rotation of said drums, a pressure fluid operated motor for each of said braking means connected to actuate said braking means, connecting means between each of said braking means and the associated motor to transmit motion from said motor to said braking means, each motor having a first conduit connected thereto to conduct pressure fluid from a supply of pressure fluid to normally operate each motor, a check valve in each of said first conduits positioned upstream of the associated motor, a second conduit to conduct pressure fluid from a supply of pressure fluid at a pressure higher than the pressure of the pressure fluid to normally operate said motors connected to each of said first conduits at a point downstream of the associated check valve, a first pressure fluid operated control valve for each first conduit connected at a point downstream of the associated check valve and connected to said second conduit to control the flow of such higher pressure pressure fluid from said second conduit into the associated first conduit, a relief valve for each of said first conduits positioned downstream of the associated check valve to release excessive pressure in the portion of each of said first conduits downstream of the associated check valve, each of said first control valves being connected to be operated by a second pressure fluid operated control valve, a third conduit connected to a supply of pressure fluid to conduct pressure fluid to said second control valves, a third control valve for each motor connected to be actuated by the associated motor positioned to control the flow of pressure fluid from said third conduit to operate the associated second control valve such that the third control valve connected to be actuated by one of said motors controls the flow of pressure fluid through said third conduit to the second control valve which controls the first control valve associated with the other motor, the position of said third control valves being such that when said motors operate normally flow of pressure fluid through said third conduit is prevented from flowing to actuate said second control valves and said first control valves, each of said first control valves being adapted and positioned such that when said motors operate normally flow of the higher pressure pressure fluid from said second conduit is prevented from flowing into said first conduits and to permit communication between each of the relief valves with the associated portion of each first conduit downstream of the associated check valve, the position of the third control valve connected to be actuated by one of said motors being such that when the last said one of said motors fails said last said third control valve is actuated to permit pressure fluid to flow through said third conduit to actuate the second control valve which controls the first control valve associated with the other of said motors to permit the higher pressure pressure fluid from said second conduit to flow into the first conduit associated with the last said other of said motors and to prevent communication of the first conduit associated with the last said other of said motors with the associated relief valve, a solenoid operated control valve connected to control the flow of pressure fluid to operate said second control valves, switch means connected to said solenoid operated control valve and connected to be operated by said load carrying member such that when said load carrying member exceeds a predetermined limit of travel said second control valves are actuated to actuate said first control valves to permit flow of the higher pressure pressure fluid to said motors.

References Cited in the file of this patent

UNITED STATES PATENTS

| | | |
|---|---|---|
| 2,658,589 | Ashton | Nov. 10, 1953 |
| 2,677,442 | Bell | May 4, 1954 |
| 2,882,098 | Newcomb | Apr. 14, 1959 |